United States Patent
Lee

(10) Patent No.: US 7,747,221 B2
(45) Date of Patent: Jun. 29, 2010

(54) METHOD OF UPLINK RADIO RESOURCE CONTROL, BASE STATION APPARATUS, AND RADIO NETWORK CONTROLLER

(75) Inventor: Jinsock Lee, Tokyo (JP)

(73) Assignee: NEC Corporation, Tokyo (JP)

( * ) Notice: Subject to any disclaimer, the term of this patent is extended or adjusted under 35 U.S.C. 154(b) by 631 days.

(21) Appl. No.: 11/572,470

(22) PCT Filed: Jul. 1, 2005

(86) PCT No.: PCT/JP2005/012220

§ 371 (c)(1),
(2), (4) Date: Jan. 22, 2007

(87) PCT Pub. No.: WO2006/011337

PCT Pub. Date: Feb. 2, 2006

(65) Prior Publication Data

US 2008/0009244 A1  Jan. 10, 2008

(30) Foreign Application Priority Data

Jul. 27, 2004 (JP) .............................. 2004-218754

(51) Int. Cl.
*H04B 1/00* (2006.01)
(52) U.S. Cl. ................... 455/63.1; 455/67.11; 455/522; 455/226.3; 370/335
(58) Field of Classification Search ................ 455/63.1, 455/67.11, 522, 226.3, 453, 436; 370/335, 370/342
See application file for complete search history.

(56) References Cited

U.S. PATENT DOCUMENTS 5,799,243 A * 8/1998 Ojaniemi ................... 455/63.1
5,963,865 A * 10/1999 Desgagne et al. ............ 455/450
6,233,222 B1 * 5/2001 Wallentin .................... 370/229
6,895,245 B2 * 5/2005 Wallentin .................... 455/436
6,956,835 B2 * 10/2005 Tong et al. ................... 370/330
7,035,284 B2 * 4/2006 Willenegger et al. ........ 370/470

(Continued)

FOREIGN PATENT DOCUMENTS

JP         8-191481 A         7/1996

(Continued)

OTHER PUBLICATIONS

3GPP TS 25.215 v5.5.0 (Sep. 2003), Technical Specification, $3^{rd}$ Generation Partnership Project; Technical Specification Group Radio Access Network; Physical layer-Measurements (FDD) (Release 5).

(Continued)

*Primary Examiner*—Minh D Dao
(74) *Attorney, Agent, or Firm*—Sughrue Mion, PLLC

(57) ABSTRACT

A method for controlling uplink radio resource which can improve the capacity and coverage of a mobile communication network includes the steps of: measuring, at base stations, both total interference and intra-cell interference values; reporting measured values to a radio network controller; calculating, at the radio network controller, allowed total interference for individual cells in response to the reporting from the base stations; sending information about the allowed total interference to the base stations; and scheduling, in response to the allowed total interference by the base stations, uplink data packet transmission of mobile stations not to exceed the allowed total interference calculated for the respective cells.

59 Claims, 5 Drawing Sheets

U.S. PATENT DOCUMENTS

| | | | |
|---|---|---|---|
| 7,146,175 B2* | 12/2006 | Rune et al. | 455/453 |
| 7,162,203 B1* | 1/2007 | Brunner | 455/63.1 |
| 7,328,033 B2* | 2/2008 | Rappaport et al. | 455/500 |
| 7,406,065 B2* | 7/2008 | Willenegger et al. | 370/335 |
| 2001/0053141 A1* | 12/2001 | Periyalwar et al. | 370/337 |
| 2001/0053695 A1* | 12/2001 | Wallentin | 455/436 |
| 2004/0166886 A1* | 8/2004 | Laroia et al. | 455/522 |
| 2004/0209624 A1* | 10/2004 | Rune et al. | 455/453 |
| 2005/0250512 A1* | 11/2005 | Zhang et al. | 455/453 |
| 2007/0105583 A1* | 5/2007 | Gerlach | 455/522 |
| 2008/0188260 A1* | 8/2008 | Xiao et al. | 455/522 |
| 2009/0207811 A1* | 8/2009 | Zhu et al. | 370/332 |

FOREIGN PATENT DOCUMENTS

| | | |
|---|---|---|
| JP | 9-69824 A | 3/1997 |
| JP | 2001-507536 A | 6/2001 |
| JP | 2001-523901 A | 11/2001 |
| JP | 2002-77042 A | 3/2002 |
| JP | 2002-247639 A | 8/2002 |
| JP | 2003-163975 A | 6/2003 |
| JP | 2003-169363 A | 6/2003 |
| JP | 2003-244754 A | 8/2003 |

OTHER PUBLICATIONS

3GPP TR 25.896 v1.2.1 (Jan. 2004), Technical Report, $3^{rd}$ Generation Partnership Project; Technical Specification Group Radio Access Network; Feasibility Study for Enhanced Uplink for UTRA FDD (Release 6).

* cited by examiner

→ Weak interference
➡ Strong interference

METHOD OF UPLINK RADIO RESOURCE CONTROL, BASE STATION APPARATUS, AND RADIO NETWORK CONTROLLER

TECHNICAL FIELD

The present invention is related to uplink data packet transmission in Wideband Code Division Multiple Access (WCDMA) technology, and more particularly to a method and apparatus for radio resource management of a network system in which each base station schedules uplink data packet transmission of mobile stations.

BACKGROUND ARTS

A typical cellular mobile communication network system is illustrated in FIG. 1. The mobile communication network includes a plurality of mobile stations (MS) 101, 105, a plurality of base stations (BTS) 102, 104 connected to the mobile stations, and a radio network controller (RNC) 103 connected to the base stations 102, 104. The base stations are assigned for the respective cells of the mobile communication network. The base station (BTS1) 102 serves cell 1 and can communicate the mobile stations (MS1, MS2) 102, 105 located within cell 1. The base station (BTS2) 104 serves cell 2 and can communicate the mobile stations (MS2, MS3, MS4) located within cell 2.

When a mobile station (MS1) 101 sends an uplink data packet to a base station transceiver (BTS1) 102 over the air, the base station 102 receives the packet and forwards the received packet toward the radio network controller (RNC) 103. The radio network controller 103 then sends the received packet to an appropriate upper layer. To support efficient uplink packet transmission from multiple mobile stations in the mobile communication network, the base station schedules the multiple mobile stations in order to maximize the number of supportable mobile stations or, equivalently, total uplink data throughput of the cell while meeting QoS (Quality of Service) requirements of individual mobile stations. As an example of uplink data packet scheduling, the Enhancement of Uplink Dedicated Channel of WCDMA mobile system is proposed (see, 3GPP TR 25.896 V1.2.1 (2004-01) Technical Report 3rd Generation Partnership Project; Technical Specification Group Radio Access Network; Feasibility Study for Enhanced Uplink for UTRA FDD; (Release 6)). The uplink data packet scheduling by a base station is described also in WO99/13600, which corresponds to JP, 2001-523901, A.

In the BTS scheduling uplink packet transmission, the common radio resource for scheduling is the total interference received by a cell. If a base station has more radio resource, then it can allow more uplink throughputs or more number of mobile stations. Conventionally, the radio network controller sets the total interference of individual cells as a pre-defined fixed level. Then the base station scheduler can schedule mobile stations up to this pre-defined upper limit.

JP, 2003-244754, A discloses the feature that a radio network controller calculates allowed interference. JP, 2002-244754, A discloses the feature that a network controller calculates uplink interference and requests radio resource to a base station.

References cited in this description will be listed below:
Patent document 1: WO99/13600
Patent document 2: JP, 2003-244754, A
Patent document 3: JP, 2002-247639, A
Non-patent document 1: 3GPP TR 25.896 V1.2.1 (2004-01) Technical Report 3rd Generation Partnership Project; Technical Specification Group Radio Access Network; Feasibility Study for Enhanced Uplink for UTRA FDD (Release 6)
Non-patent document 2: 3GPP TS 25.215 V5.5.0 (2003-09) 3rd Generation Partnership Project; Technical Specification Group Radio Access Network; Physical layer-Measurements (FDD) (Release 5)

DISCLOSURE OF THE INVENTION

Problem to be Solved by the Invention

The main problem related to conventional technology, i.e. using a pre-defined fixed total interference, is that there is no guarantee on schedulable radio resources hence reducing the coverage of network. One example is shown in FIG. 1, where base stations (BTS1, BTS2) 102 and 104 control the uplink data packet transmissions of multiple mobile stations, the radio network controller 103 assigns equal total interference for both cells (cell 1 and cell 2) and the number of mobile stations of both cells is identical. In this case, if BTS1 102 schedules mobile station (MS2) 105 thereby causing high interference toward cell 2, then the total interference at cell 2 increases. Conventionally, BTS2 104 will reduce the scheduling resource due to the increased interference from cell 1. Then this reduction of scheduling resource of cell 2 will benefit cell 1 so that BTS1 102 will schedule more uplink data packets resulting further reduction of scheduling resource of cell 2. Consequently, the schedulable radio resource of cell 2 will be gradually reduced and the imbalance of capacity of two cells will increase.

The additional impact of the problem of conventional technology is a reduced overall capacity of network. Considering the same scenario mentioned above, BTS1 102 will schedule more data packets than BTS2 104 even though the total capacity of two cells can be improved if BTS2 104 schedules more data packets than BTS1 102.

Further impact of the problem of conventional technology is reduced coverage of network. In the presence of large number of cells interfering strongly each other, some base stations run out of available radio resource to schedule mobile stations hence uplink data packet transmission is prohibited as a result. In order words, conventional technology could create coverage holes in the network due to the problem aforementioned.

The objective of the present invention is to provide a method for a radio network controller to find an optimized resource allocation method maximizing the overall network capacity, improving network capacity balance as well as improving the coverage of network. This objective is non-trivial one because the radio network controller should make decision without knowledge on both randomly distributed mobile stations and which radio condition is rapidly changing in time, as well as rapid radio resource reshuffling is carried out by the base station scheduler.

Means for Solving the Problem

The objective of the present invention is achieved by a method for uplink radio resource control in a mobile communication network which includes a plurality of mobile stations, a plurality of base stations connected to the plurality of mobile stations, and a radio network controller connected to the plurality of base stations, the plurality of base stations serving respective cells, the method comprising the steps of measuring, at the plurality of base stations, both total interference and intra-cell interference values, reporting measured total interference values and measured intra-cell interference values from the plurality of base stations to the radio network controller, calculating, at the radio network controller, allowed total interference for individual cells in response to the reporting from the plurality of base stations, sending information about the allowed total interference from the radio network station to the plurality of base stations, and scheduling, in response to the sent allowed total interference, by the plurality of base stations, uplink data packet transmission of the plurality of mobile stations not to exceed the allowed total interference calculated for the respective cells.

The method may further comprise the step of expecting, at the plurality of base stations, inter-cell interference values based on measured total interference values and measured intra-cell interference values. In this case, the plurality of base stations report to the radio network controller the expected inter-cell interference values instead of the measured total interference values.

Benefits of the aspect of proposed invention related to base station reporting both measured total interference and measured intra-cell interference are described in the following:

When a base station schedules uplink data packet transmission of multiple mobile stations which belong to a cell, the base station has knowledge on both total interference and intra-cell interference of the cell. On the other hand, the radio network controller should control total interferences of multiple cells in the network. Both measurements of total interference and intra-cell interference from multiple cells in the network enable the radio network controller to extract characteristics between cells. Then efficient global optimization of radio resource management can be achieved by predicting the characteristics so as to improve the capacity and coverage of the network.

From the base station reporting, a key characteristic of uplink data packet transmission, i.e. the inter-cell interference metric between cells in the network is derived by proposed method described by equation (6) later. Having accurate prediction of inter-cell interference relationship between cells in a network offers the radio network controller an ability to estimate inter-cell interference at given arbitrary allowed schedulable radio resource, i.e. allowed intra-cell interference as represented by equation (9) described later.

From the base station reporting of the measured intra-cell interference, the radio network controller can calculate the utilization of radio resource of respective cells in the network. This utilization factor, in addition to the inter-cell interference metric, enables the radio network controller to adjust assigned radio resource of respective cells in such way that total capacity of the network is improved.

Benefits of the proposed method of scheduling resource allocation are described in the following:

The method proposed in the present invention enables the radio network controller to assign more radio resource to a highly utilized and lowly interfering cell than a lowly utilized and highly interfering cell. Compared to conventional technology which does not consider the inter-cell interference condition of a network, the proposed method improves the total capacity of network using limited common radio resource.

The method proposed in the present invention enables the radio network controller to adjust the allowed total interference to keep the utilization of cells at target level. The procedure for this is illustrated in FIG. 6 described later. Hence, common radio resource of a network is distributed among cells in the network in such a way that allocated resources are equally utilized among the cells. This enables a balanced capacity assignment among multiple cells to offer fair performance between mobile stations in the network.

Furthermore the proposed method also enables the radio network controller to prioritize the resource allocation for a highly utilized cell at given mixture of highly and lowly utilized cells in a network. The procedure for this is illustrated in FIG. 6 described later. Hence the radio network controller controls capacity imbalance between the cells and therefore improving coverage of the network. Further, at the given mixture of highly and lowly interfering cells in the network, the radio network controller may prioritize the resource allocation for a lowly interfering cell by controlling target utilization of the cell. The procedure for this is illustrated in FIG. 7. Since less interfering cells are assigned more common radio resource, this improves total radio capacity of the network.

EXPLANATION OF REFERENCE NUMERALS

Figure 1:
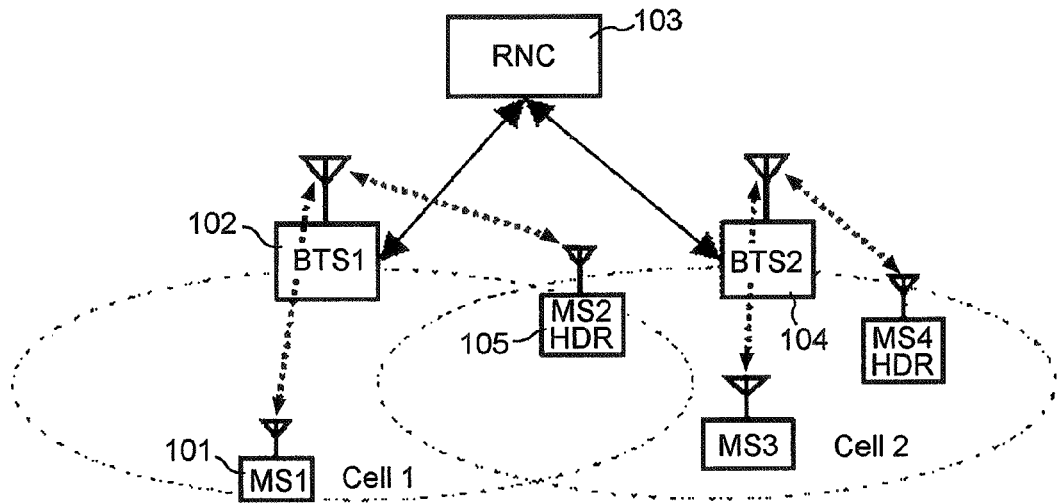
FIG. 1 is a diagram illustrating a typical mobile communication network system with base station scheduling uplink packet transmission of multiple mobile stations and radio network controller controlling uplink radio resources of multiple base stations.

101, 105, 201 Mobile station
102, 104, 202, 301 Base station
103, 203 Radio network controller
204 Data packet transmitter
205 Scheduler slave unit
206 Base station scheduler
207, 209 Data packet receiver
208 Data packet decoder
210, 212 Measurement unit
211 Radio resource controller
301 Cell of interest

BEST MODE FOR CARRYING OUT THE INVENTION

The following describes a detail example of realization of the proposed invention.

Figure 2:
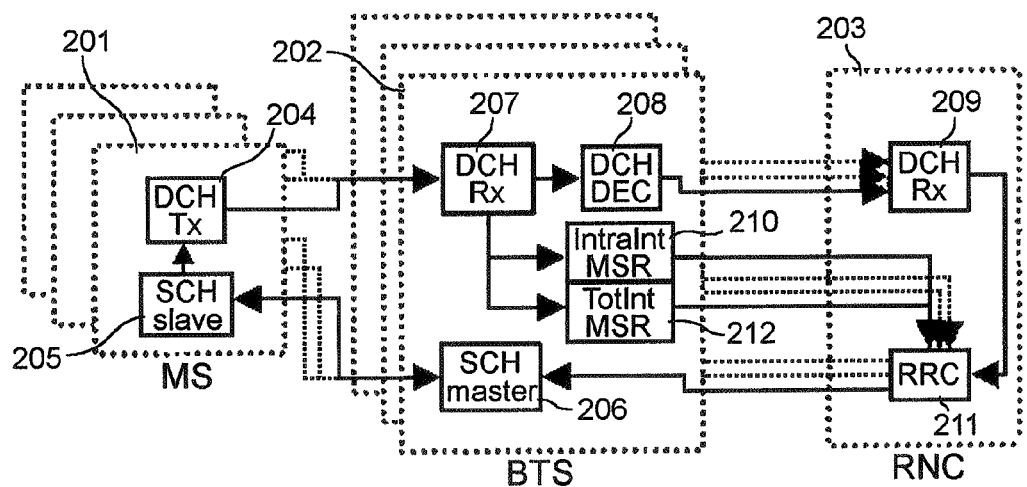
FIG. 2 is a block diagram illustrating a mobile communication network system in which a method according to one embodiment of the present invention is realized.

FIG. 2 illustrates a mobile communication network system which is based on WCDMA technology and includes multiple mobile stations 201 connected to a base station 202 while a radio network controller 203 is connected to multiple base stations 202. Each mobile station (MS) includes a data packet transmitter (DCH Tx) 204, and a scheduler slave unit (SCH slave) 205 which is controlled by a base station scheduler 206.

Each base station 202 includes the base station scheduler (SCH master) 206 which functions as a master of the scheduler slave unit 205 in each mobile station 201, a data packet receiver (DCH Rx) 207 for receiving data packets from each mobile station 201, a data packet decoder 208 for decoding the received packets and transmitting the decoded packets to the radio network controller 203, a measurement unit (MSR) 210 for measuring intra-cell interference (IntraInt), and a measurement unit (MSR) 212 for total interference (TotInt).

The radio network controller 203 includes a data packet receiver (DCH Rx) for receiving data packets from each base station 202, and a radio resource controller (RRC) 211 for controlling radio resources of the cells.

In the system illustrated in FIG. 2, the data packet transmitter 204 of the mobile station 201 sends an uplink data packet to the connected serving base station 202 and the transmission is controlled by the slave unit 205 of scheduler in the mobile station 202. The base station scheduler 206 controls the slaves unit 205 of scheduler of all mobile stations served by the base station 202. The base station 202 and mobile station 201 communicate to each other by sending scheduling related information. As an example, the Enhancement of Uplink Dedicated Channel of WCDMA mobile system assumes fast scheduling information processing by use of a dedicated control channel. By use of this fast scheduling processing, the base station 202 can utilize given total interference more efficiently by scheduling the best radio conditioned mobile station.

The data packet receiver 207 in the base station 202 receives data packets from the mobile stations and it decodes the sent data packets by the data packet decoder 208 in order to forward the decoded packets to the data packet receiver 209 in the radio network controller 203. The total interference, or equivalently total received power, of a cell can be measured by the measurement unit 212 at the base station 202 which serves the cell. The total interference I can be broken down into three different sub-components as shown in the following equation:

$$I = I_{Inter} + I_{Intra} + N_0 \quad (1)$$

The thermal noise $N_0$ is due to the natural phenomenon of radio communication channel while both intra-cell and inter-cell interferences, denoted by $I_{Intra}$ and $I_{Inter}$, are due to the uplink packet transmission of own and neighboring cells, respectively. The base station can measure the total interference I by measuring total received power at the measurement unit 212. And also the base station 202 can measure the intra-cell interference at measurement unit 210 because it knows the uplink data packets transmitted by scheduled mobile stations.

One of key task of base station scheduler 206 is, as illustrated by equation (2), to maintain the total interference I in equation (1) less than a pre-defined level $I_{MAX}$ in order to provide network stability:

$$I_{MAX} > I = I_{Inter} + I_{Intra} + N_0 \quad (2)$$

The pre-defined levels of the total interference of multiple cells are controlled by the radio resource controller 211 in the radio network controller 203.

In the system considered above, the radio network controller 203 receives information on both measured total interference and measured intra-cell interference of cells in the network. Then inter-cell interference can be derived by equation (2) assuming the thermal noise level of the base station is known a priori. Then an explicit relationship between the intra-cell and inter-cell interference can be established as follows:

$$I_{Inter}(m) = \sum_{i \in \Psi(m)} \eta(m, i) I_{Intra}(i) \quad (3)$$

where $I_{Inter}(m)$ and $I_{Intra}(m)$ represent the inter and intra-cell interferences at cell m, respectively, while $\eta(m, i)$ is an inter-cell interference metric between cell m and cell i. Also $\Psi(m)$ denotes a set of a interfering cell or cells toward cell m.

Figure 3:
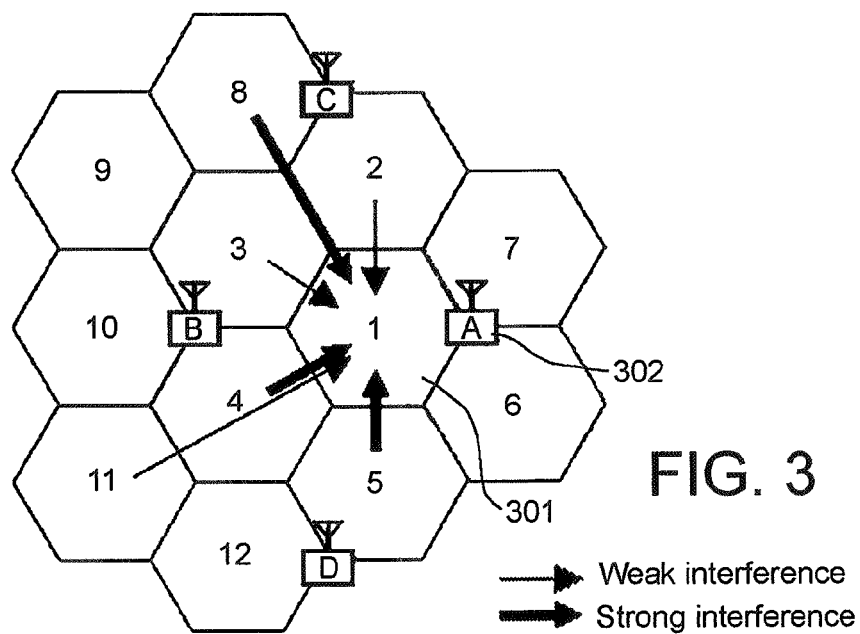
FIG. 3 is a diagram illustrating inter-cell interference transmitted from neighboring cells.

FIG. 3 illustrates the relationship in equation (3) with typical mobile cellular layout. In the illustrated network layout, sector-divided cells each having a hexagonal shape are used and base stations (A, B, C, D) each serving three adjacent cells are arranged. Cell 1 is a cell of interest 301 and is controlled by a base station A 302. In this example, inter-cell interference of cell 1 has six independent contributions from the six neighboring cells out of total eleven cells in the network. Out of six inter-cell interferences, there are three strong interferences from two immediate neighboring cells, cell 4 and cell 5. Although cell 6 and cell 7 are also close to cell 1, those contribution can be assumed to be marginal due to a sector antenna gain. Also closely located cell 3 is interfering less than distantly located cell 8 because of larger path loss (or shadowing) between interfering mobile stations in cell 3 and cell 1

Generally, the inter-cell interference metric is a function of cell distance, sector orientation, user distribution and scheduling policy, etc. Furthermore, the properties of the metric should be noted as follows:

I. Slow Time Variation:

At a given short observation interval, both the inter-cell interference $I_{Inter}(m)$ and the intra-cell interference $I_{Intra}(m)$ are rapidly time varying functions and they depend on busty nature of uplink data packets as well as scheduling policy deployed at the base station. Short term averaging of these random variables can average out the dynamic nature and therefore the inter-cell interference metric becomes a slowly time varying function.

II. Limited Neighboring Set:

Without loss of generality, it is assumed that there is a limited number of interfering cells toward cell m in the network, and these interfering cells are generally denoted by $\Psi(m)$. This assumption can reduce the inter-dependency of cells in the network dramatically. This set can be chosen by physical cell distance, cell frequency allocation, sector orientation, etc. From FIG. 3, it can be seen that only three strong interfering cells exist for cell 1.

Figure 4:
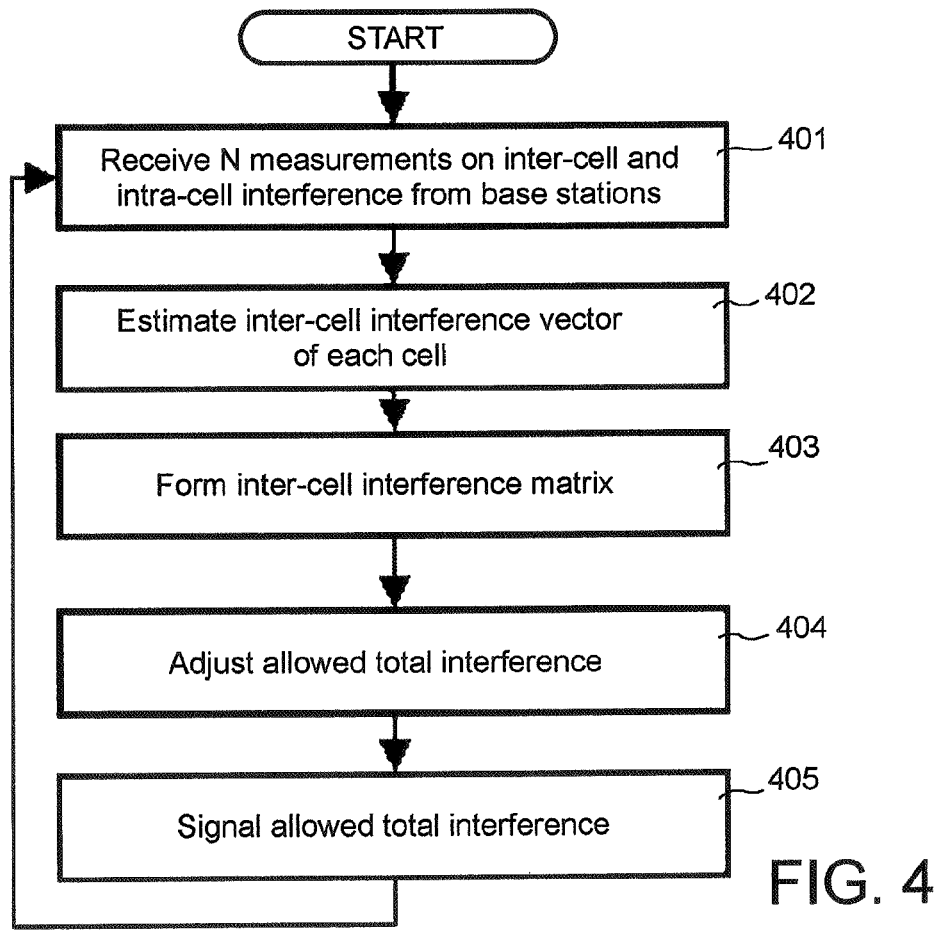
FIG. 4 is a flowchart illustrating the procedure in the radio network controller for updating total interference.

In the system considered above and illustrated in FIG. 2, the radio network controller assigns the total interference by a manner showing in the following. FIG. 4 illustrates the procedure for assigning the total interference.

Firstly, the radio network controller (RNC) receives N measurements on inter-cell and intra-cell interference from the base stations at step 401. Of course, the radio network controller can receive measurements on total interference instead of the measurements on inter-cell interference and estimate the inter-cell interference by using equation (2). Furthermore, note that the thermal noise $N_0$ is of the base station, and is pre-measured and known to the radio network controller.

Then the radio network controller stores the multiple measurements of received inter-cell interference and scheduled intra-cell interference over a period of time in order to form the following equation:

$$\vec{\hat{I}}_{Inter}(m) = \vec{\eta}(m)^T \hat{I}_{Intra}(m) \qquad (4)$$

where $$\vec{\hat{I}}_{Inter}(m)$$

is an N dimensional vector representing the inter-cell measurement vector of cell m, and $\hat{I}_{Intra}(m)$ is an $N_\Psi \times N$ dimensional matrix representing the intra-cell measurement matrix of interfering cells of cell m. The inter-cell interference vector of cell m is denoted by $\vec{\eta}(m)$ and it is an $N_\Psi$ dimensional vector. The number of measurement is denoted by N, and the number of total interfering cells of cell m is denoted by and $N_\Psi$. If equation (4) is rewritten in a more explicit form, the following equations (5a) to (5c) will be obtained.

$$\vec{\eta}(m) = [\eta(m, \Psi_1) \quad \eta(m, \Psi_2) \quad \ldots \quad \eta(m, \Psi_N)] \qquad (5a)$$

$$\vec{\hat{I}}_{Inter}(m) = \begin{bmatrix} \hat{I}_{Inter}(m, T_1) \\ \hat{I}_{Inter}(m, T_2) \\ \vdots \\ \hat{I}_{Inter}(m, T_N) \end{bmatrix} \qquad (5b)$$

$$\hat{I}_{Intra}(m) = \begin{bmatrix} \hat{I}_{Intra}(\Psi_1, T_1) & \hat{I}_{Intra}(\Psi_1, T_2) & \ldots & \hat{I}_{Intra}(\Psi_1, T_N) \\ \hat{I}_{Intra}(\Psi_2, T_1) & \hat{I}_{Intra}(\Psi_2, T_2) & \ldots & \hat{I}_{Intra}(\Psi_2, T_N) \\ \vdots & & & \vdots \\ \hat{I}_{Intra}(\Psi_{N_\Psi}, T_1) & \hat{I}_{Intra}(\Psi_{N_\Psi}, T_2) & \ldots & \hat{I}_{Intra}(\Psi_{N_\Psi}, T_N) \end{bmatrix} \qquad (5c)$$

Next, the radio network controller estimates the inter-cell interference vector of each cell at step 402. From equation (4), the inter-cell interference vector of cell m can be estimated using the following equation:

$$\vec{\eta}(m) = \vec{\hat{I}}_{Inter}(m)(\hat{I}_{Intra}(m))^T ((\hat{I}_{Intra}(m))\hat{I}_{Intra}(m)^T)^{-1} \qquad (6)$$

To guarantee the existence of estimated inter-cell interference vector, it is needed to be checked whether the inversion of matrix in equation (6) is possible. Equation (7) shows that the radio network controller can estimate the inter-cell interference metric if a sufficient number of measurements is available. Specifically, the inversion is possible when the number of measurements is larger than the number of interfering cells of cell m:

$$\text{rank}(\hat{I}_{Intra}(m)\hat{I}_{Intra}(m)^T) = \min(N_\Psi, N) = N_\Psi \qquad (7)$$

In fact, if the measurement duration is very short, it is possible that adjacent measurement can be highly correlated to each other, so that the effective number of independent measurements can be small than the number of interfering cells. To prevent such a case, one can select sufficient measurement duration and large set of measurement vectors if possible. Since inter-cell interference metric is also slowly varying function in time, a sliding window based measurement interval can be useful to improve estimation quality.

Next, the radio network controller forms a inter-cell interference matrix of the network at step 403. The inter-cell interference matrix can be formed from the estimated inter-cell interference metrics of each cell from equation (6) as shown in the following equation:

$$\hat{\eta} = [\vec{\hat{\eta}}(1) \quad \vec{\hat{\eta}}(2) \quad \ldots \quad \vec{\hat{\eta}}(N_{cell})]^T \qquad (8)$$

where $\vec{\eta}(m)$ and $\hat{\eta}$ are an $N_{cell}$ dimensional inter-cell interference vector of cell m and $N_{cell} \times N_{cell}$ dimensional inter-cell interference matrix of the network, respectively. Note that $N_{cell}$ represents the total number of cells in the network. Compared to equation (6), the dimension of the individual inter-cell interference vector is increased but the number of non-zero elements thereof remains unchanged. From equation (8), then the following global cell interference relationship can be derived:

$$\vec{I}_{Inter} = \eta \vec{I}_{Intra} \qquad (9)$$

where the inter-cell and intra-cell interference vectors $\vec{I}_{Inter}$ and $\vec{I}_{Intra}$ are both $N_{cell}$ dimensional vectors, i.e., $$\vec{I}_{Inter} = \begin{bmatrix} I_{Inter}(1) \\ I_{Inter}(2) \\ \vdots \\ I_{Inter}(N_{cell}) \end{bmatrix}, \vec{I}_{Intra} = \begin{bmatrix} I_{Intra}(1) \\ I_{Intra}(2) \\ \vdots \\ I_{Intra}(N_{cell}) \end{bmatrix} \qquad (10)$$

The system equation shown in equation (9) provides a fundamental design framework of uplink data packet transmission. At a given intra-cell interference vector, the system equation provides expected total interference vector $\vec{I}$ as follows:

$$\vec{I} = \vec{I}_{Intra} + \vec{I}_{Inter} \qquad (11)$$
$$= (E + \eta)\vec{I}_{Intra}$$

where E is an $N_{cell}$ dimensional unit matrix.

Equation (11) shows that the radio network controller can predict total interference of all cells in the network at given arbitrary allowed intra-cell interference thanks to the estimated inter-cell interference metric of the network.

Then, the radio network controller adjusts the allowed total interference at step 404. In other words, the radio network controller performs resource allocation procedure for the respective cells. Hence the resource allocation procedure can utilize the information on relation between the total interference and the allocated intra-cell interference in order to prevent the aforementioned problems of the conventional technology such as capacity imbalance between cells, reduced coverage and degradation of total network capacity. Finally, the radio network controller signals the allowed total interference to the plurality of the base stations at step 405 and then the process goes back step 401.

Using the example of two cell scenario shown in FIG. 1, the resource allocation strategy in step 404 can be devised based on the information available by equations (6), (9) and (11).

Figure 5:
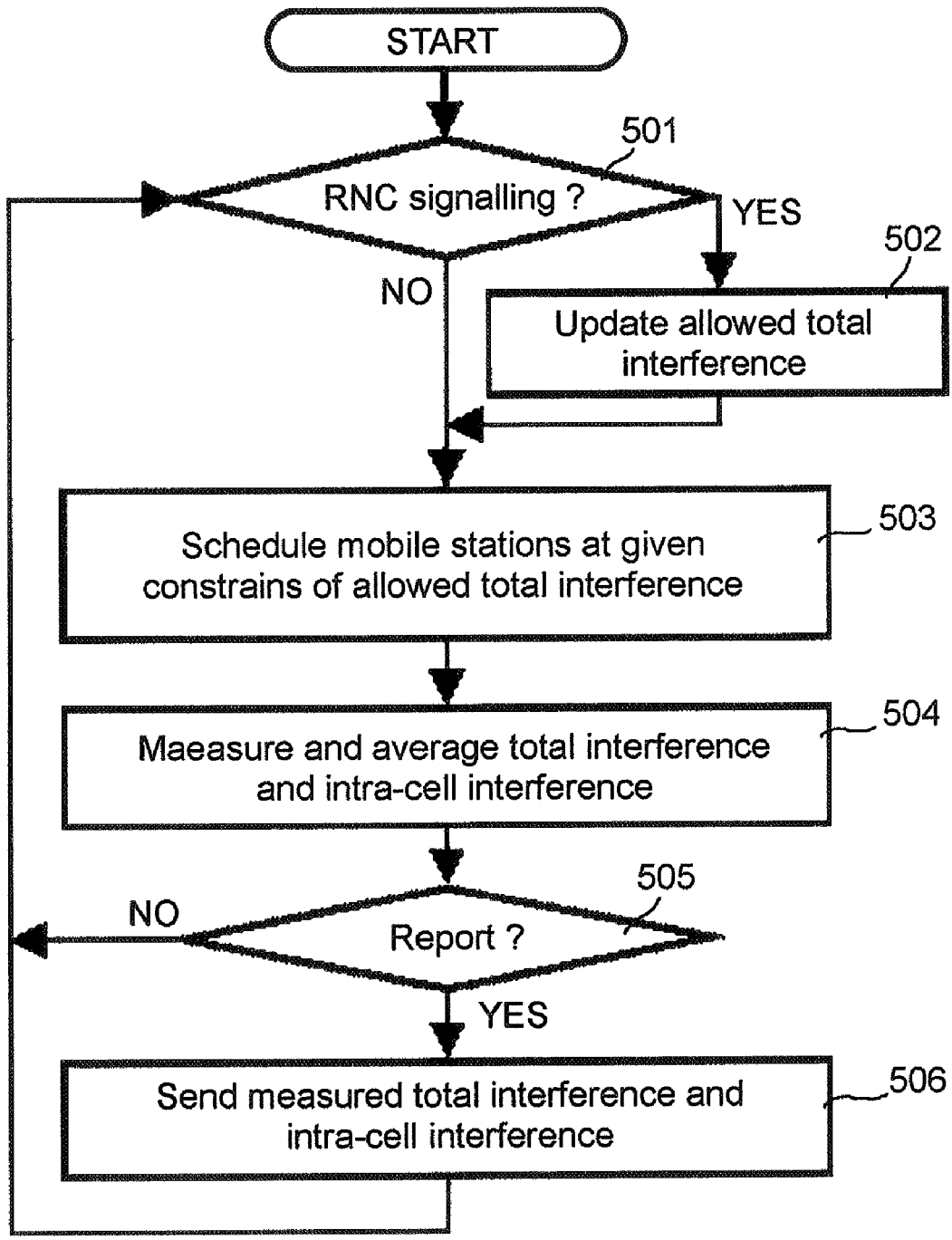
FIG. 5 is a flowchart illustrating the procedure in the base station for updating total interference.

Next, the procedures which each base station performs will be described with reference to FIG. 5.

The base station continuously observes the signaled allowed total interference from the controlling radio network controller (RNC) at step 501. If the radio network controller signals, the base station updates the value in response to the radio network controller signaling of a new value of total interference at step 502. Then the base station schedules the mobile stations which meet the requirement of total interference to be less than the signaled allowed total interference at step 503. In order to calculate the average of intra-cell and total interferences, the base station measures the instantaneous level of both interferences at step 504. At a given reporting criterion, for example, periodic reporting, the base station sends the averaged interferences to the radio network controller at steps 505 and 506. Then the procedure of the base station goes back step 501.

Next, the detailed procedures of the resource allocation will be described.

The initial step of the resource allocation is to find how currently assigned resource of the cell of interest is being utilized by the base station scheduler. One metric which can be defined is a cell utilization such that:

$$U(k) = \frac{\hat{I}_{Intra}(k)}{I_{Intra}(k)} \quad (12)$$

where $\hat{I}_{Intra}(k)$ and $I_{Intra}(k)$ are, respectively, measured and allowed intra-cell interference of cell k. The utilization is proportional to the cell traffic load, such as the number of mobile stations in the cell. If more mobile stations are added to a cell, the measured intra-cell interference will increase and, as a result, the utilization is also increased. Conversely, the utilization will decrease as the number of mobile stations reduces.

In a next step of the resource allocation, the radio network controller compares the utilization of two cells, a first cell and second cell, and the inter-cell interference metrics between them. When utilization of the first cell is higher than that of the second cell while the first cell is not causing high interference to the second cell, then the radio network controller should increase radio resource of the first cell. Also if utilization of the first cell is lower than that of the second cell but the first cell is causing high interference to the second cell, the radio network controller should reduce the radio resource of the first cell.

In a next step of the resource allocation, the radio network controller should guarantee total interference of both cells are upper limited. If more resource is added to the first cell, it should consider the impact on the second cell such that:

$$I_{MAX} > I(2)$$

$$I_{MAX} > I_{Intra}(2) + \eta(2,1)(I_{Intra}(1) + \Delta) \quad (13)$$

where we assumed, without loss of generality, to increase radio resource for the first cell (cell 1) and the above inequality checks whether the impact of such a change can be accommodated by the second cell (cell 2).

The benefits of the proposed method described above are explained in the following:

The radio network controller can calculate inter-cell interference of one cell from measured total interference and measured intra-cell interference of the other cell. This inter-cell interference information is used for the resource allocation of each cell so that it is possible to adjust the radio resource of one cell while preserving total interference of the other cell below safety threshold.

From the measured intra-cell interference, the radio network controller can measure the utilization of radio resources of two cells and monitor a necessity of radio resource adjustment in both cells. Then, by increasing radio resource of a highly utilized and less interfering cell than a lowly utilized or highly interfering cell, the radio network controller can adjust the radio resource to increase total capacity of both cells.

Figure 6:
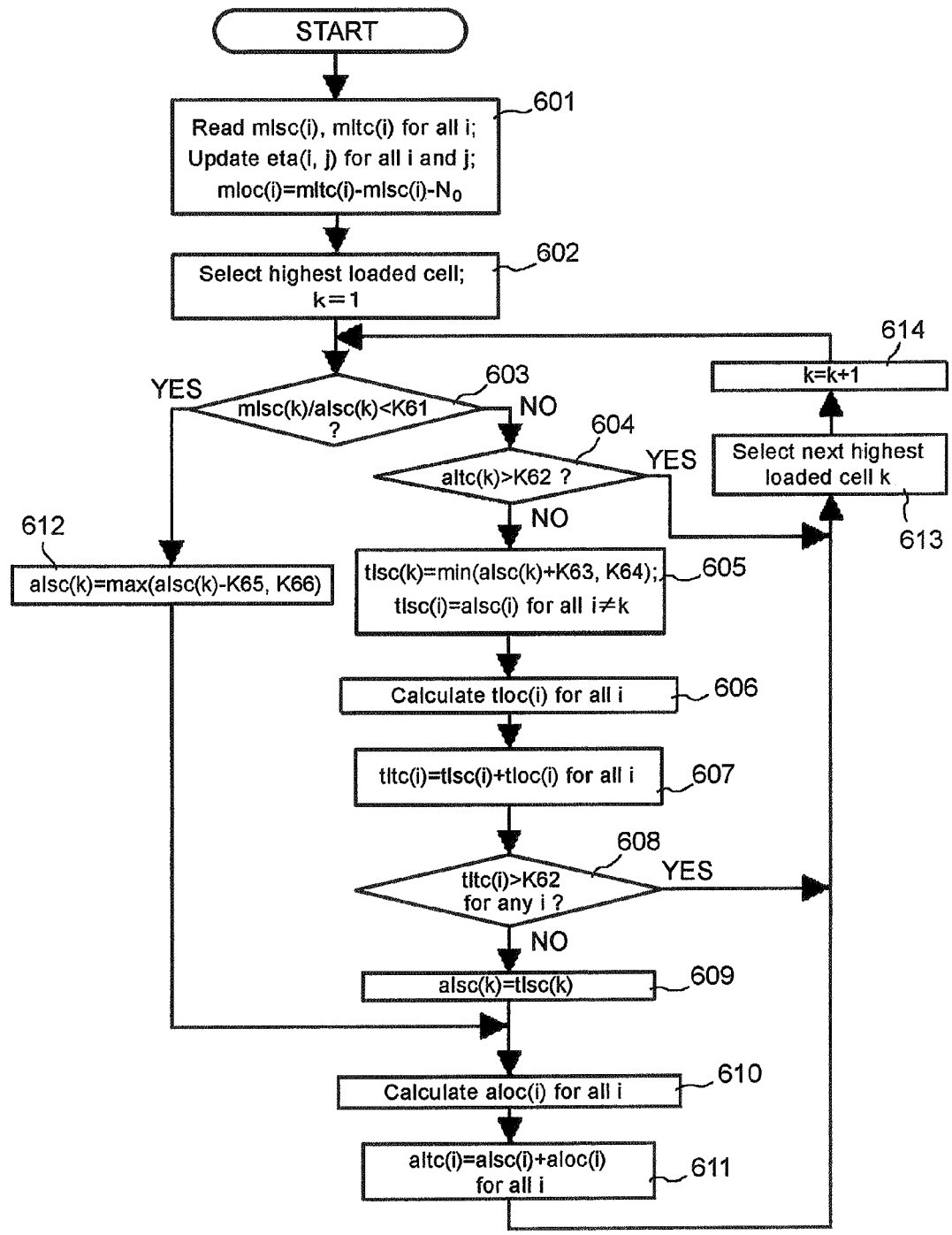
FIG. 6 is a flowchart illustrating the procedure in the radio network controller for calculating total interference.

So far a case in which a network comprising of two cells is considered, the aforementioned principles can be generalized to the network comprising arbitrary number of cells as described below. FIG. 6 shows a flow chart of the detailed procedure.

Figure 7:
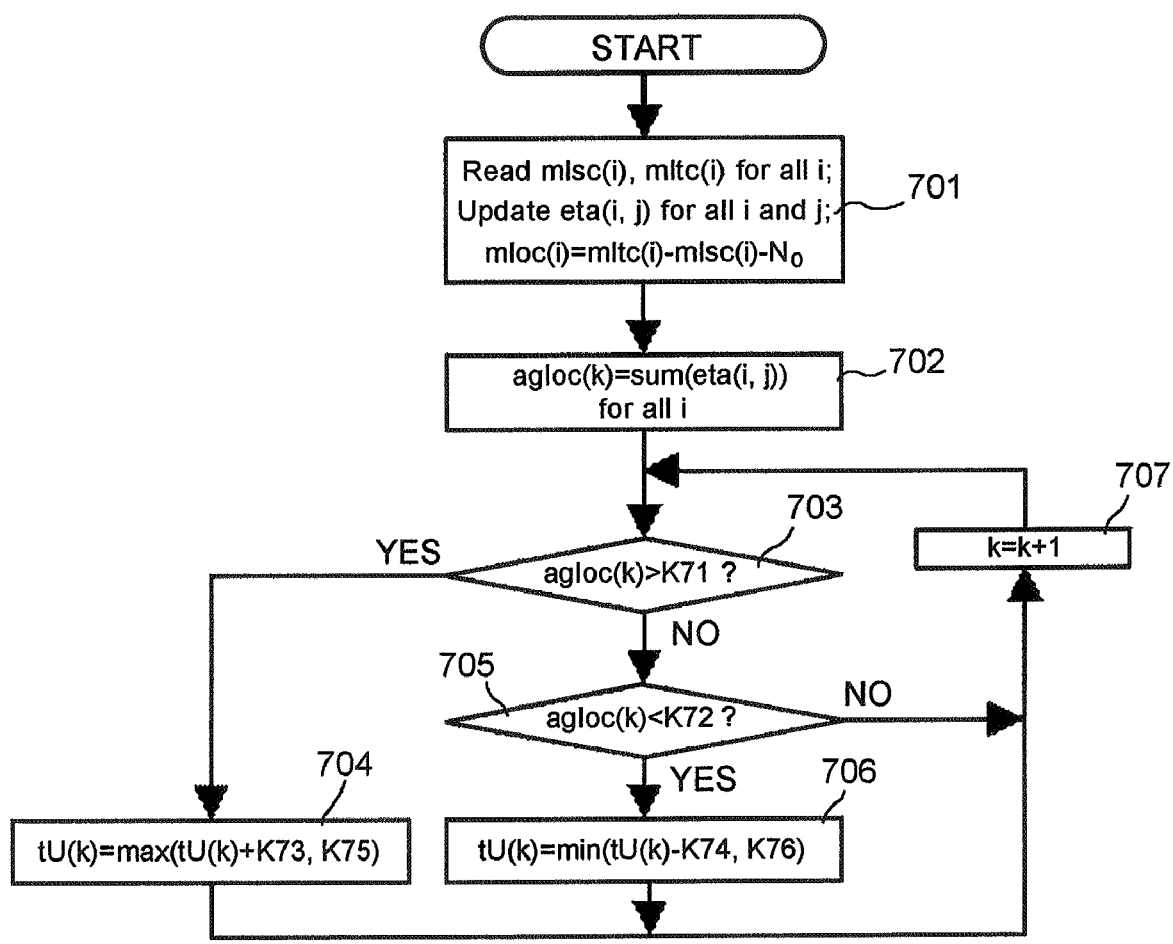
FIG. 7 is a flowchart illustrating the procedure in the radio network controller for calculating target utilization.

In FIGS. 6 and 7, mlsc(k) and mloc(k) represent the measured average intra-cell interference and measured average inter-cell interference of cell k, respectively. A sum of mlsc(k) and mloc(k) is denoted by mltc(k). Similarly, alsc(k) and aloc(k) represent the assigned intra-cell and inter-cell interferences of cell k, respectively, and tlsc(k) and tloc(k) represent the temporary intra-cell and inter-cell interferences of cell k, respectively. A sum of alsc(k) and aloc(k) is denoted by altc(k), and a sum of tlsc(k) and tloc(k) is denoted by tltc(k). An inter-cell interference metric from cell n to cell k is represented by eta(k,n).

Variables K61, K62, and K63 represent target utilization, maximum total interference, and positive adjustment factor for intra-cell interference, respectively. Variables K64, K65 and K66 represent maximum intra-cell interference, negative adjustment factor for intra-cell interference, and minimum intra-cell interference, respectively.

Initially, the reported measurements from base stations, i.e. total interference and intra-cell interference, are updated and inter-cell interference is calculated by relationship shown in equation (1) at step 601. Starting from the highest utilized cell at step 602, a new intra-cell interference of each cell is calculated as follows:

The utilization of cell is calculated and it is checked, by comparing the utilization with the target utilization, whether the selected cell is over-utilized or under-utilized at step 603. If it is over-utilized, it is further checked whether it has a room for increase of allowed total interference at step 604. If the total interference is already close to the maximum level, it is not able to increase further in order to keep the total interference below the maximum level. Then the process goes to step 613.

If there is a room for further increase at step 604, it is checked whether an increase of the intra-cell interference of the selected cell can cause a violation of maximum allowed total interference of other cells at steps 605, 606, 607, 608. If the increase can cause the violation on other cells, the process goes to step 613. If the increase does not cause the violation on other cells at step 608, then the new adjustment of intra-cell interference is performed at step 609. Once the new adjustment of intra-cell interference is performed then the update of the resulting allowed total interference is followed at steps 610, 611, and then the process goes to step 613.

In step 613, a next-highest utilized cell is selected and control parameter k is incremented at step 614, and then the process goes back step 603 so that the procedure is repeated until the lowest utilized cell. If the utilization of cell is smaller than the threshold at step 603, the allocated intra-cell interference is reduced by a pre-defined level at step 612 and then the process goes to step 610.

The method proposed above inherits the benefits of the method described for two cells scenario.

Additionally, a benefit related to the method described above is that the radio network controller can estimate how much inter-cell interference is diminished at neighboring cells by a reduction of intra-cell interference of the interfering cell or cells. With knowledge of an inter-cell interference matrix, the radio network controller can predict the lowered inter-cell interference at neighboring cells which, then, can be further utilized by intra-cell interference later.

Furthermore, when there is more than one cell requiring more radio resource, the method described above gives a priority to a cell with high utilization of radio resource over a cell with lower radio utilization. This enables the highly utilized cell to consume the common radio resource in prior to the lowly utilized cell so that cells in the network exhibit a similar utilization of radio resource. If similar radio resource utilization is possible between different cells, a fair end-user experience can be achieved among the different cells in the network. Considering the example shown in FIG. 1, if both cells have equally large number of mobile stations, the capacity of network would be upper bounded by total interference of cell 2 due to high interference from cell 1. In this case, the utilization of cell 2 will be higher than that of cell 1. The method above allow the radio network controller to prioritize resource allocation of cell 2 hence preventing allocating more resource to cell 1.

In the following, a method to control the target utilization of cell will be described.

The adjustment method described in FIG. 6 assumes a pre-defined target utilization of a cell. The target utilization of cell can, then, be also controlled by a method illustrated in FIG. 7. In FIG. 7, agloc(k) and tU(k) represent aggregated total inter-cell interference caused by cell k and target utilization of cell k, respectively. Variables K71 and K72 represent thresholds for defining a highly interfering cell and a lowly interfering cell, respectively, and K73 and K74 represent a positive and negative adjustment factors for target utilization, respectively. Maximum and minimum target utilization are denoted as K75 and K76, respectively.

Initially, the radio network controller updates the measured intra-cell interference and total interference, and calculates the inter-cell interference matrix at step 701. Then an aggregated total inter-cell interference of the selected cell is calculated at step 702, and compared with a pre-defined upper threshold at step 703. If the aggregated interference is larger than the threshold, the target utilization of the selected cell is increased by a pre-defined adjustment factor at step 704, and the process goes to step 707. The adjustment is upper bounded by a pre-defined maximum target utilization factor. If the aggregated interference is not larger than the threshold at step 703, then the aggregated interference is compared with a pre-defined lower threshold at step 705. if it is smaller than the lower threshold, the target utilization of the selected cell is decreased by a pre-defined adjustment factor at step 706 and the process goes to step 707. The adjustment is lower bounded by a pre-defined minimum target utilization factor. If the aggregated interference is not smaller than the lower threshold at step 705, then the control directly process goes to step 707. In step 707, control parameter k is incremented, and then the process goes back step 703 so that the procedure is repeated for all cells.

The resource adjustment method in illustrated in FIG. 6 requires the target utilization as a key system parameter. A method of determining the target utilization is described in above. The method is to allow a less interfering cell, causing little inter-cell interference toward its neighboring cell, to have higher intra-cell interference than a cell causing significant inter-cell interference. In order words, the method decreases the target utilization of a less interfering cell hence more intra-cell interference can be allocated according to the aforementioned resource adjustment method in FIG. 6. Considering the example shown in FIG. 1, target utilization of cell 2 is adjusted to a smaller level than that of cell 1 because cell 1 is interfering cell 2 more than cell 2 does toward cell 1. If the numbers of mobile stations of two cells are identical, cell 2 with lower target utilization will have higher intra-cell interference than cell 1. Generally, if a cell is causing significant interference toward more than one neighboring cells, then the radio network controller can reduces the intra-cell interference of such a cell so that the capacity of interfered cells can be improved, hence overall capacity of the network can be improved.

In general, a base station apparatus in a mobile communication network is provided with, in addition to an antenna and a radio transmission/reception unit, a computer for controlling the operation of the base station apparatus. Therefore, the above-described base station apparatus for performing the resource control may be one which is realized by a computer constituting a base station apparatus reads a program for implementing the functions described above and executes the program. Similarly, the above-described radio network controller for performing the resource control may be one which is realized by a computer constituting a radio network controller reads a program for implementing the functions described above and executes the program.

Such a program is, for example, recorded in a computer-readable recording medium and is read into the computer by mounting the recording medium into the computer. Alternatively, such a program may be one which is read into the computer through a network such as Internet. Therefore, such a program, a recoding medium recorded with such a program, and a program product including such a program are included in the scope of the present invention.

The invention claimed is:

1. A method for uplink radio resource control in a mobile communication network which includes a plurality of mobile stations, a plurality of base stations connected to said plurality of mobile stations, and a radio network controller connected to said plurality of base stations, said plurality of base stations serving respective cells, the method comprising the steps of:
   measuring, at said plurality of base stations, information about total interference and information about intra-cell interference;
   reporting measured information about total interference and measured information about intra-cell interference from said plurality of base stations to said radio network controller;
   said radio network controller, which has received said information about total interference and said information about intro-cell interference, sending information about allowed total interference for individual cells to said plurality of base stations; and
   said plurality of base stations scheduling, in response to said sent information about allowed total interference, uplink data packet transmission of said plurality of mobile stations.

2. The method according to claim 1, wherein, in said scheduling step, said plurality of base stations schedule uplink data packet transmission of said plurality of mobile stations not to exceed allowed total interference notified by means of said information about allowed total interference.

3. The method according to claim 2, wherein said information about total interference is a value of total interference and said information about intra-cell interference is a value of intra-cell interference.

4. The method according to claim 1, further comprising the step of: calculating, at said radio network controller, allowed total interference for individual cells in response to said reporting from said plurality of base stations.

5. A mobile communication system for controlling uplink radio resource in a mobile communication network which includes at least: a plurality of mobile stations; a plurality of base stations connected to said plurality of mobile stations, said plurality of base stations serving respective cells; and a radio network controller connected to said plurality of base stations, wherein said plurality of base stations include: means for measuring information of total interference and information of intra-cell interference; and means for reporting measured information about total interference and measured information about intra-cell interference to said radio network controller, wherein said radio network controller includes: means for receiving said information about total interference and said information about intra-cell interference; and means for sending information about allowed total interference for individual cells to said plurality of base stations, and wherein said plurality of base stations further include means for scheduling, in response to said sent information about allowed total interference, uplink data packet transmission of said plurality of mobile stations.

6. The system according to claim 5, wherein the mobile communication network is a CDMA network.

7. The system according to claim 6, wherein said means for measuring periodically measures an average of intra-cell interference by monitoring uplink packet transmission activity of said plurality of mobile stations.

8. The system according to claim 6, wherein, when utilization of a first cell is lower than utilization of a second cell and interference of the first cell to the second cell is high, allowed total interference of the first cell is reduced.

9. The system according to claim 6, wherein, when utilization of a first cell is higher than utilization of a second cell and interference of the first cell to the second cell is not high, allowed total interference of the first cell is increased.

10. The system according to claim 6, wherein said radio network controller calculates utilization of a cell as a ratio between said measured intra-cell interference value over allowed intra-cell interference.

11. The system according to claim 6, wherein said radio network controller includes:

means for assigning target utilization for the cells in the network; and means for adjusting said allowed total interference so that said utilization of each cell maintains at said target utilization.

12. The system according to claim 11, wherein said means for adjusting adjusts said allowed total interference for respective cells starting from a highest utilized cell to a lowest utilized cell.

13. The system according to claim 11, wherein said means for assigning increases or decreases said target utilization of a cell if an aggregated inter-cell interference caused by said cell is low or high, respectively.

14. The system according to claim 11, wherein said means for adjusting adjusts, in a step wise manner, assignment of said allowed total interference by a predefined step size.

15. The system according to claim 5, wherein said means for scheduling schedules uplink data packet transmission of said plurality of mobile stations not to exceed allowed total interference notified by means of said information about allowed total interference.

16. The system according to claim 15, wherein said information about total interference is a value of total interference and said information about intra-cell interference is a value of intra-cell interference.

17. The system according to claim 5, wherein said radio network controller further includes: means for calculating allowed total interference for individual cells in response to said reporting from said plurality of base stations.

18. The system according to claim 17, wherein said means for calculating calculates said allowed total interference as a sum of allowed intra-cell interference and expected inter-cell interference.

19. The system according to claim 5, wherein said radio network controller includes: means for estimating expected inter-cell interference matrix by assuming that expected inter-cell interference of each cell is a weighted linear combination of allowed intra-cell interferences of other neighboring cells as the following equation:

$$I_{Inter}(m) = \sum_{i \in \Psi(m)} \eta(m, i) I_{Intra}(i)$$

where $I_{inter}(m)$ and $I_{intra}(m)$ represent, respectively, said expected inter-cell interference and said allowed intra-cell interference at $m^{th}$ cell while $\eta(m, i)$ is inter-cell interference metric to the $m^{th}$ cell from $i^{th}$ cell, and $\Psi(m)$ denotes a set of an interfering cell or cells toward said $m^{th}$ cell.

20. The system according to claim 5, wherein said means for measuring periodically measures an average of intra-cell interference by monitoring uplink packet transmission activity of said plurality of mobile stations.

21. The system according to claim 5, wherein said radio network controller includes: means for estimating inter-cell interference among cells, with information about inter- cell interference matrix, and wherein said allowed total interference is increased when utilization of a cell is high and interference to another cell is not higher than a pre-determined level.

22. The system according to claim 5, wherein said radio network controller includes: means for calculating inter-cell interference from a first cell to a second cell and inter-cell interference from the second cell to the first cell to update allowed total interference of said first cell and said second cell based on measured total interference values of said first cell and second cell as well as measured intra-cell interference values of said first cell and said second cell.

23. The system according to claim 5, wherein, when utilization of a first cell is lower than utilization of a second cell and interference of the first cell to the second cell is high, allowed total interference of the first cell is reduced.

24. The system according to claim 5, wherein, when utilization of a first cell is higher than utilization of a second cell and interference of the first cell to the second cell is not high, allowed total interference of the first cell is increased.

25. The system according to claim 5, wherein said radio network controller calculates utilization of a cell as a ratio between said measured intra-cell interference value over allowed intra-cell interference.

26. The system according to claim 5, wherein said radio network controller includes:
   means for assigning target utilization for the cells in the network; and
   means for adjusting said allowed total interference so that said utilization of each cell maintains at said target utilization.

27. The system according to claim 26, wherein said means for adjusting adjusts said allowed total interference for respective cells starting from a highest utilized cell to a lowest utilized cell.

28. The system according to claim 26, wherein said means for assigning increases or decreases said target utilization of a cell if an aggregated inter-cell interference caused by said cell is low or high, respectively.

29. The system according to claim 26, wherein said means for adjusting adjusts, in a step wise manner, assignment of said allowed total interference by a predefined step size.

30. A mobile station in a mobile communication system for controlling uplink radio resource in a mobile communication network which includes at least: a plurality of mobile stations; a plurality of base stations connected to said plurality of mobile stations, said plurality of base stations serving respective cells; and a radio network controller connected to said plurality of base stations, wherein
   information of total interference and information of intra-cell interference is measured at said plurality of base stations,
   measured information about total interference and measured information about intra-cell interference is reported from said plurality of base stations to said radio network controller,
   said radio network controller, which has received said information about total interference and said information about intra-cell interference, sends information about allowed total interference for individual cells to said plurality of base stations,
   said plurality of base stations schedule, in response to said sent information about allowed total interference, uplink data packet transmission of said plurality of mobile stations, and
   said mobile station performs uplink data packet transmission based on said scheduling.

31. The mobile station according to claim 30, wherein, upon said scheduling, said plurality of base stations schedule uplink data packet transmission of said plurality of mobile stations not to exceed allowed total interference notified by means of said information about allowed total interference.

32. The mobile station according to claim 31, wherein said information about total interference is a value of total interference and said information about intra-cell interference is a value of intra-cell interference.

33. The mobile station according to claim 30, wherein said radio network controller calculates allowed total interference for individual cells in response to said reporting from said plurality of base stations.

34. A base station apparatus in a mobile communication system for controlling uplink radio resource in a mobile communication network which includes at least: a plurality of mobile stations; a plurality of base stations connected to said plurality of mobile stations, said plurality of base stations serving respective cells; and a radio network controller connected to said plurality of base stations, said base station apparatus comprising:
   means for measuring information of total interference and information of intra-cell interference;
   means for reporting measured information about total interference and measured information about intra-cell interference to said radio network controller; and
   means for scheduling, in response to information about allowed total interference which is sent from said radio network controller, uplink data packet transmission of said plurality of mobile stations.

35. The base station apparatus according to claim 34, wherein the mobile communication network is a CDMA network.

36. The base station apparatus according to claim 35, wherein said means for measuring periodically measure an average of intra-cell interference by monitoring uplink packet transmission activity of said plurality of mobile stations.

37. The base station apparatus according to claim 34, wherein said means for scheduling schedules uplink data packet transmission of said plurality of mobile stations not to exceed allowed total interference notified by means of said information about allowed total interference.

38. The base station apparatus according to claim 37, wherein said information about total interference is a value of total interference and said information about intra-cell interference is a value of intra-cell interference.

39. The base station apparatus according to claim 34, wherein said means for measuring periodically measures an average of intra-cell interference by monitoring uplink packet transmission activity of said plurality of mobile stations.

40. A radio network controller in a mobile communication system for controlling uplink radio resource in a mobile communication network which includes at least: a plurality of mobile stations; a plurality of base stations connected to said plurality of mobile stations, said plurality of base stations serving respective cells; and a radio network controller connected to said plurality of base stations, said radio network controller comprising:
   means for receiving said information about total interference and said information about intra-cell interference from said plurality of base stations; and
   means for sending information about allowed total interference for individual cells to said plurality of base stations.

41. The radio network controller according to claim 40, wherein the mobile communication network is a CDMA network.

42. The radio network controller according to claim 41, comprising:
   means for assigning target utilization for the cells in the network; and
   means for adjusting said allowed total interference so that said utilization of each cell maintains at said target utilization.

43. The radio network controller according to claim 42, wherein said means for adjusting adjusts said allowed total interference for respective cells starting from a highest utilized cell to a lowest utilized cell.

44. The radio network controller according to claim 42, wherein said means for assigning increases or decreases said target utilization of a cell if an aggregated inter-cell interference caused by said cell is low or high, respectively.

45. The radio network controller according to claim 42, wherein said means for adjusting adjusts, in a step wise manner, assignment of said allowed total interference by a predefined step size.

46. The radio network controller according to claim 40, comprising: means for calculating allowed total interference for individual cells in response to said reporting from said plurality of base stations.

47. The radio network controller according to claim 46, wherein said means for calculating calculates said allowed total interference as a sum of allowed intra-cell interference and expected inter-cell interference.

48. The radio network controller according to claim 40, comprising: means for estimating expected inter-cell interference matrix by assuming that expected inter-cell interference of each cell is a weighted linear combination of allowed intra-cell interferences of other neighboring cells as the following equation:

$$I_{Inter}(m) = \sum_{i \in \Psi(m)} \eta(m, i) I_{Intra}(i)$$

where $I_{inter}(m)$ and $I_{intra}(m)$ represent, respectively, said expected inter-cell interference and said allowed intra-cell interference at $m^{th}$ cell while $\eta(m, i)$ is inter-cell interference metric to the $m^{th}$ cell from $i^{th}$ cell, and $\Psi(m)$ denotes a set of an interfering cell or cells toward said $m^{th}$ cell.

49. The radio network controller according to claim 40, comprising: means for estimating inter-cell interference among cells, with information about inter-cell interference matrix, wherein said allowed total interference is increased when utilization of a cell is high and interference to another cell is not higher than a pre-determined level.

50. The radio network controller according to claim 40, comprising: means for calculating inter-cell interference from a first cell to a second cell and inter-cell interference from the second cell to the first cell to update allowed total interference of said first cell and said second cell based on measured total interference values of said first cell and second cell as well as measured intra-cell interference values of said first cell and said second cell.

51. The radio network controller according to claim 40, comprising:
means for assigning target utilization for the cells in the network; and
means for adjusting said allowed total interference so that said utilization of each cell maintains at said target utilization.

52. The radio network controller according to claim 51, wherein said means for adjusting adjusts said allowed total interference for respective cells starting from a highest utilized cell to a lowest utilized cell.

53. The radio network controller according to claim 51, wherein said means for assigning increases or decreases said target utilization of a cell if an aggregated inter-cell interference caused by said cell is low or high, respectively.

54. The radio network controller according to claim 51, wherein said means for adjusting adjusts, in a step wise manner, assignment of said allowed total interference by a pre-defined step size.

55. A computer-readable recording medium encoded with a program making a computer constituting a base station apparatus of a mobile communication system execute the processes of:
measuring information about total interference and information about intra-cell interference;
reporting measured information about total interference and measured information about intra-cell interference to a radio network controller; and scheduling, in response to information about allowed total interference which is sent from said radio network controller, uplink data packet transmission of a plurality of mobile stations.

56. The computer-readable recording medium according to claim 55, wherein the scheduling process comprises scheduling uplink data packet transmission of said plurality of mobile stations not to exceed allowed total interference notified by means of said information about allowed total interference.

57. The computer-readable recording medium according to claim 56, wherein said information about total interference is a value of total interference and said information about intra-cell interference is a value of intra-cell interference.

58. A computer-readable recording medium encoded with a program making a computer constituting a radio network controller of a mobile communication system execute the processes of:
receiving, from a plurality of base stations, information about total interference and information about intra-cell interference; and
sending information about allowed total interference for individual cells to said plurality of base stations.

59. The computer-readable recording medium according to claim 58, wherein the program further makes the computer execute the process of calculating allowed total interference for individual cells in response to reporting from said plurality of base stations.

* * * * *